(12) United States Patent
Li

(10) Patent No.: US 11,232,790 B2
(45) Date of Patent: Jan. 25, 2022

(54) CONTROL METHOD FOR HUMAN-COMPUTER INTERACTION DEVICE, HUMAN-COMPUTER INTERACTION DEVICE AND HUMAN-COMPUTER INTERACTION SYSTEM

(71) Applicant: BOE TECHNOLOGY GROUP CO., LTD., Beijing (CN)

(72) Inventor: Yanfu Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 174 days.

(21) Appl. No.: 16/502,708

(22) Filed: Jul. 3, 2019

(65) Prior Publication Data
US 2020/0013406 A1    Jan. 9, 2020

(30) Foreign Application Priority Data

Jul. 3, 2018 (CN) .......................... 201810721447.6

(51) Int. Cl.
*G10L 15/22* (2006.01)
*G06F 3/16* (2006.01)
*G06K 9/00* (2006.01)
*G10L 15/08* (2006.01)

(52) U.S. Cl.
CPC .............. *G10L 15/22* (2013.01); *G06F 3/167* (2013.01); *G06K 9/00671* (2013.01); *G10L 15/08* (2013.01); *G10L 2015/223* (2013.01)

(58) Field of Classification Search
CPC ....... G10L 15/22; G10L 15/265; G10L 15/08; G10L 2015/223; G06F 3/167; G06F 3/16; G06F 21/32; H04M 2201/40; G06K 9/00671; G06K 9/00248; G06K 9/00308; G06K 9/00261; G06K 9/00228; A47G 1/06
USPC .................................. 704/231–257, 270–275
See application file for complete search history.

(56) References Cited

U.S. PATENT DOCUMENTS

| 7,242,988 | B1 * | 7/2007 | Hoffberg | H04N 21/4622 700/28 |
| 7,899,915 | B2 * | 3/2011 | Reisman | H04N 21/4316 709/228 |
| 8,281,339 | B1 * | 10/2012 | Walker | H04N 5/445 725/45 |

(Continued)

FOREIGN PATENT DOCUMENTS

| CN | 102006566 A | 4/2011 |
| CN | 102625261 A | 8/2012 |

(Continued)

OTHER PUBLICATIONS

First Office Action for Chinese Patent Application No. 201810721447.6 dated Aug. 23, 2019.

*Primary Examiner* — Jesse S Pullias
(74) *Attorney, Agent, or Firm* — Calfee Halter & Griswold LLP

(57) ABSTRACT

A control method for a human-computer interaction device, a human-computer interaction device, and a human-computer interaction system are described. The control method includes: capturing first voice information of a first object; identifying a second object related to the first voice information; acquiring first information related to the second object; and presenting the first information.

12 Claims, 5 Drawing Sheets acquiring location information of the second object in a cloud server — S231 acquiring a weather condition of the location from the Internet — S232

(56) References Cited

U.S. PATENT DOCUMENTS

| | | | | |
|---|---|---|---|---|
| 10,379,808 B1 * | 8/2019 | Angel | ................. | G06F 3/1454 |
| 2001/0040886 A1 * | 11/2001 | Jimenez | .............. | H04L 65/1069 |
| | | | | 370/352 |
| 2004/0193441 A1 * | 9/2004 | Altieri | ................. | A63F 13/216 |
| | | | | 709/203 |
| 2010/0007480 A1 * | 1/2010 | Uozumi | ............... | B60W 40/09 |
| | | | | 340/436 |
| 2015/0195489 A1 * | 7/2015 | Sobti | ..................... | H04N 7/142 |
| | | | | 348/14.08 |
| 2015/0302720 A1 | 10/2015 | Zhang et al. | | |
| 2017/0013188 A1 * | 1/2017 | Kothari | ................. | B60K 35/00 |
| 2017/0319148 A1 * | 11/2017 | Shahin | .................. | H04N 5/247 |
| 2018/0268747 A1 * | 9/2018 | Braun | ................ | G06K 9/00671 |

FOREIGN PATENT DOCUMENTS

| | | |
|---|---|---|
| CN | 103164315 A | 6/2013 |
| CN | 105101869 A | 11/2015 |
| CN | 107766482 A | 3/2018 |

\* cited by examiner

CONTROL METHOD FOR HUMAN-COMPUTER INTERACTION DEVICE, HUMAN-COMPUTER INTERACTION DEVICE AND HUMAN-COMPUTER INTERACTION SYSTEM

RELATED APPLICATION

The present application claims the benefit of Chinese Patent Application No. 201810721447.6, filed on Jul. 3, 2018, the entire disclosures of which are incorporated herein by reference.

TECHNICAL FIELD

The present disclosure relates to the field of display technologies and human-computer interaction technologies, and in particular to a control method for a human-computer interaction device, a human-computer interaction device, and a human-computer interaction system.

BACKGROUND

Human-computer interaction devices such as smart picture frames have been increasingly popular in people's daily life. However, smart picture frames in the related art generally only have the basic display function, that is, the function to display image content stored locally or from the network by their screens. Although the existing smart picture frame is provided with an input and output device such as a camera, a microphone, a speaker, etc., they are only used for image information collection, voice information collection, and the collected information is simply used to select display content or play specific sound. This results in problems of a single function and a poor human-computer interaction effect for the existing smart picture frame.

SUMMARY

According to an aspect of the present disclosure, a control method for a human-computer interaction device is provided, comprising: capturing first voice information of a first object; identifying a second object related to the first voice information; acquiring first information related to the second object; and presenting the first information.

In some embodiments of the control method according to the present disclosure, the human-computer interaction device comprises a smart picture frame.

In some embodiments of the control method according to the present disclosure, the presenting the first information comprises presenting the first information in at least one of an audio manner or a video manner.

In some embodiments of the control method according to the present disclosure, the acquiring first information related to the second object comprises: acquiring, from a cloud server or locally, the pre-stored first information related to the second object.

In some embodiments of the control method according to the present disclosure, the first information related to the second object comprises a weather condition of a location where the second object is located, and the acquiring first information related to the second object comprises: acquiring pre-stored location information of the second object from a cloud server; and acquiring a weather condition of the location from the Internet based on the location information.

In some embodiments of the control method according to the present disclosure, the control method further comprises: after the presenting the first information, outputting a voice capturing prompt; capturing second voice information of the first object; and transmitting the second voice information in at least one of a voice format or a text format to a further human-computer interaction device for presentation to the second object.

In some embodiments of the control method according to the present disclosure, the control method further comprises: capturing image information of the first object; identifying a current physical state of the first object based on the image information of the first object; generating second information related to the first object based on the current physical state of the first object; and presenting the second information.

In some embodiments of the control method according to the present disclosure, the generating second information related to the first object based on the current physical state of the first object comprises: transmitting the current physical state of the first object to a further human-computer interaction device for presentation to the second object; and receiving third voice information of the second object from the further human-computer interaction device as the second information.

In some embodiments of the control method according to the present disclosure, the capturing image information of the first object comprises capturing a real-time image of the first object, and identifying a current physical state of the first object based on the image information of the first object comprises: recording the duration in real-time from zero while capturing the real-time image, and taking the current frame image as an initial frame image and recording face image in the initial frame image and coordinates of eyes in the initial frame image; comparing each subsequent frame with the initial frame and determining whether the face image in each subsequent frame and the coordinates of the eyes match the initial frame; in response to the face image in each subsequent frame and the coordinates of the eyes both matching the initial frame, comparing the recorded duration with a duration threshold to determine whether the recorded duration exceeds the duration threshold; in response to the recorded duration exceeding the duration threshold, identifying that the current physical state of the first object is a fatigue state.

In some embodiments of the control method according to the present disclosure, the generating second information related to the first object based on the current physical state of the first object comprises: in response to the first object being in a fatigue state, generating the second information regarding prompting the first object to have a rest.

In some embodiments of the control method according to the present disclosure, before the acquiring first voice information of the first object, the control method further comprises: capturing a voice wake-up signal; collecting a voice wake-up signal; collecting at least one of an authentication voice or an authentication image as a authentication information in response to the voice wake-up signal; comparing at least one of the collected authentication voice or the authentication image with at least one of a voice template or an image template of the first object that are pre-stored to determine whether the authentication information matches the at least of the voice template or the image template; and in response to the authentication information matches the at least of the voice template or the image template, outputting an authentication success information.

According to another aspect of the present disclosure, a human-computer interaction device is provided, comprising: a voice information capturer configured to capture first voice information of the first object; a voice information identifying circuit configured to identify a second object related to the first voice information; a first information acquiring component configured to acquire first information related to the second object; and a first information presenting component configured to present the first information.

In some embodiments of the human-computer interaction device according to the present disclosure, the human-computer interaction device further comprises: an image information capturer configured to capture image information of the first object; an image information identifying circuit configured to identify a current physical state of the first object based on the image information of the first object; a second information generating component configured to generate second information related to the first object based on the current physical state of the first object; and a second information presenting component configured to present the second information.

In some embodiments of the human-computer interaction device according to the present disclosure, the human-computer interaction device further comprises: a first transmitter configured to transmit the current physical state of the first object to further human-computer interaction device for presentation to the second object; and a first receiver configured to receive third voice information of the second object from the further human-computer interaction device as the second information.

According to yet another aspect of the present disclosure, a human-computer interaction system is provided, comprising a first human-computer interaction device and a second human-computer interaction device that is in remote communication with the first human-computer interaction device, wherein the first human-computer interaction device is a human-computer interaction device according to some embodiments of the present disclosure, and the second human-computer interaction device comprises: a second receiver configured to receive a current physical state of the first object from the first human-computer interaction device; a presenting component configured to present the current physical state of the first object; an information capturer configured to capture third voice information of the second object; a second transmitter configured to transmit the third voice information to the first human-computer interaction device.

According to still another aspect of the present disclosure, a computer readable storage medium having stored thereon computer readable instructions that, when executed, control a human-computer interaction device according to some embodiments of the present disclosure to implement a control method according to some embodiments of the present disclosure.

BRIEF DESCRIPTION OF THE DRAWINGS

In order to more clearly illustrate the technical solutions in embodiments of the disclosure or in the prior art, the appended drawings needed to be used in the description of the embodiments or the prior art will be introduced briefly in the following. Obviously, the drawings in the following description are only some embodiments of the disclosure, and for those of ordinary skills in the art, other drawings may be obtained according to these drawings under the premise of not paying out creative work.

DETAILED DESCRIPTION OF THE DISCLOSURE

In order to make objects, technical solutions and advantages of the present disclosure more clear, the present disclosure will be further described in detail below with reference to specific embodiments and the accompanying drawings.

It should be noted that all expressions using "first" and "second" in the embodiments of the present disclosure are used to distinguish different entities or parameters with the same name. Terms such as "first" and "second" are used only for the convenience of the description, and it should not be construed as limiting the embodiments of the present disclosure. This will not be repeated in the subsequent embodiments.

An object of the present disclosure is to provide a control method for a human-computer interaction device, a human-computer interaction device, and a human-computer interaction system, which effectively expand the function of the human-computer interaction device and achieve better human-computer interaction effect.

Figure 1:
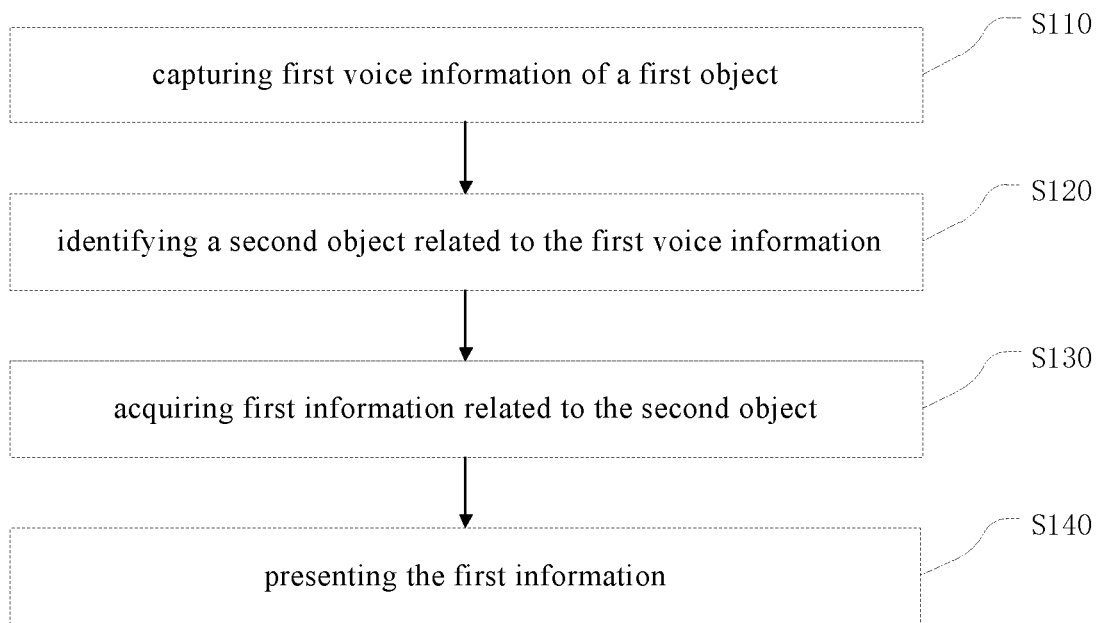
FIG. 1 illustrates a flow chart of a control method for a human-computer interaction device according to some embodiments of the present disclosure.

FIG. 1 illustrates a flow chart of a control method for a human-computer interaction device according to some embodiments of the present disclosure. A human-computer interaction device herein refers to any electronic device or terminal capable of interoperating with a user, such as a smart picture frame having a human-computer interaction function, a mobile phone, a desktop computer, a notebook computer, a tablet computer, and the like.

As shown in FIG. 1, a control method for a human-computer interaction device according to some embodiments of the present disclosure includes the following steps S110-S140. These steps are explained in detail below.

S110, a capturing step: capturing first voice information of a first object.

The "object" herein generally refers to a user of a human-computer interaction device, which may be a human user or other non-human user, such as an animal or a plant or other item. Generally, the so-called human-computer interaction (HCI) refers to a process of information exchange between a person and a computer using a certain language in a certain interaction manner to complete a certain task. The computer herein can be extended to a variety of human-computer interaction devices as described above. Therefore, the human-computer interaction is the process of information exchange between a user and an interactive device.

As the first step of human-computer interaction, the human-computer interaction device needs to capture information sent by the user, and then feedback based on the information sent by the user, thereby completing the interaction process. In step 110, voice information may be captured, for example, by a voice capture device (e.g., a microphone) disposed on the human-computer interaction device. The feedback information is then output to the user based on the captured information in a subsequent step. In this embodiment, the first object is a user who is in front of and interacting with the human-computer interaction device such as a smart picture frame.

Of course, as described below, the human-computer interaction device may also capture image information of the first object through an image capture device (e.g., a camera). In some embodiments, the human-computer interaction device may only capture voice information or only image information, or may simultaneously capture both voice and image information, so the two kinds of information are not necessarily related and may be independent of each other.

S120, an identifying step: identifying a second object related to the first voice information.

After capturing the first voice information, the human-computer interaction device may be controlled to identify the first voice information by a voice identification module, and determine whether a second object is included in the voice information, and output first information related to the second object if the second object is identified. The second object may a target user related to the first object (i.e., the current user) or a target user of interest to the first object.

In some embodiments, the step S120 of identifying a second object related to the first voice information may include identifying a keyword related to the second object from the first voice information. A preset keyword can be extracted from the first voice information by using a voice recognition technology, wherein the keyword is related to the second object. For example, keyword information related to the second object may be pre-stored in the human-computer interaction device, such as a name, a childhood name, a nickname, etc. of the second object, and any other keywords that can indicated the second object. In the voice recognition process, the pre-stored keywords may be searched or extracted in the first voice information, and if the search or extraction is successful, the subsequent steps are continued, that is, the information related to the second object is acquired and displayed for the first object.

In the application scenario of the smart picture frame, the microphone may capture the voice of the current user in real time. When the first voice input by the current user is captured, the keyword is extracted by the preset keyword extraction strategy for the first voice first voice. If the voice contains the content corresponding to the keyword, the voice keyword is successfully extracted.

In a specific application scenario, the current user and the target user are two users of kinship (such as parents and children), and the current user and the target user are in different cities. When the current user is in front of the smart picture frame (i.e., the human-computer interaction device) at home, the utterance with the target user name may be intentionally or unintentionally spoken, for example, "how is Xiao Ming there", wherein the name "Xiao Ming" of the target user is set as the voice keyword. In this case, the smart picture frame can extract the voice keyword as "Xiao Ming" based on the captured first voice input by the current user "how is Xiao Ming there", and the target user (i.e., the second object related to the first voice information) can be determined based on the keywords "Xiao Ming".

S130, an acquiring step: acquiring first information related to the second object.

The first information related to the second object may include information about a location, a working condition, a physical condition, and the like of the second object in a city different from that of the first object pre-stored in the human-computer interaction device, or information stored and updated in real time on a local or cloud server by the second object through another human-computer interaction device or a common electronic device (such as a mobile phone), and the human-computer interaction device can acquire the corresponding first information from the human-computer interaction device of the second object or the cloud server. In addition, if the first information is not stored anywhere, the human-computer interaction device may also request corresponding first information from another human-computer interaction device used by the second object and then receive the first information input by the second object via another human-computer interaction device (e.g., via voice or keyboard, etc.).

When the keyword related to the second object is identified, it is determined that the first object wishes to pay attention to the second object, that is, to obtain information about the second object, such as current status, including physical condition, working condition, climate of the location where the second object is located, and other information about the second object. As described above, the first information, especially the current status information of the second object, should generally be stored in a cloud server bound to the human-computer interaction device, and the cloud server can also be bound to another human-computer interaction device or a common electronic device (such as a mobile phone) used by the second object, then the first information can be stored on the cloud server and updated in real time by the second object, so that the human-computer interaction device of the first object, when in use, can obtain the corresponding first information in real time from the cloud server.

In addition, optionally, if the first information is not stored in the cloud server, the human-computer interaction device may also request corresponding first information from another human-computer interaction device used by the second object and then receive the first information input by the second object via another human-computer interaction device (e.g., via voice or keyboard, etc.). Optionally, if the first information is not stored in the cloud server, the human-computer interaction device may also download the first information from the Internet. For example, when the first information is weather information of the location of the second object, weather forecast or weather information of almost any city can be known from the Internet. In this case, the human-computer interaction device may acquire weather data of the city where the second object is located from the Internet according to the pre-stored location information of the second object. The weather data may generally include: weather type, temperature, humidity, wind, air quality, and the like.

S140, a presenting step: presenting the first information.

The presentation of the first information can be implemented by various means such as text, voice, image, video, and the like. Specifically, the human-computer interaction device may display the first information to the first object through the screen, for example, the weather condition of the city where the second object is located and the corresponding picture, or may also display the first information in an audio manner by presenting the weather condition using a speaker, or a combination thereof, to satisfy the desire of the first object (such as a parent) to know the current situation of the second object (children). The format conversion process may be required before the first information is presented. For example, when the first information is in the format of text, in order to broadcast the first information by voice, it needs to be converted into a voice format; likewise, the voice format may be required to convert into a text format, and the like.

In an application scenario in which a smart picture frame is used as a human-computer interaction device, for example, the second object "Xiao Ming" is located in Beijing, and the weather type in the acquired weather data in Beijing is raining, when the weather condition is output, it can output a picture, a video of a rainy day, or a rainy sounds. In another example, if the wind in the acquired weather data of Beijing is large, the feedback content obtained is a picture, a video, or a windy sound that expresses a strong wind.

In step S140, in response to the first voice information of the current user, the first information related to the second object is output through a human-computer interaction device such as a smart picture frame, for example, the weather condition of the city in which the second object is located, so that the current user (i.e., the first Object) can lively and accurately know the weather conditions of the city in which the target object or the second object is located. Therefore, the excellent human-computer interaction effect based on the smart picture frame is realized, and the function of the smart picture frame is effectively expanded by fully utilizing the existing components of the smart picture frame.

Figure 2:
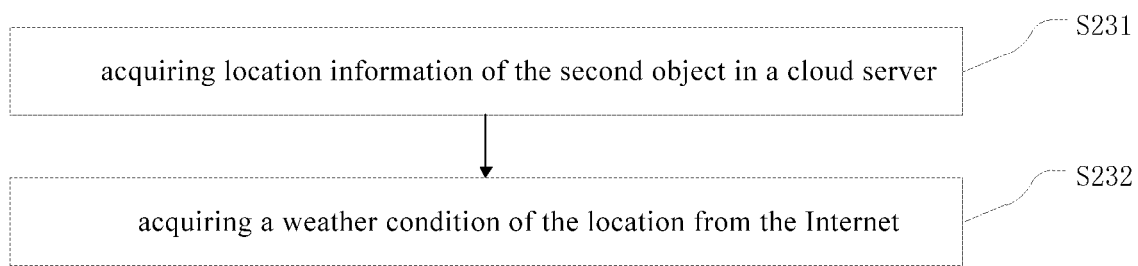
FIG. 2 illustrates a flow chart of a control method for a human-computer interaction device according to some embodiments of the present disclosure.

FIG. 2 illustrates a flow chart of a control method for a human-computer interaction device according to some embodiments of the present disclosure. As shown in FIG. 2, the first information related to the second object includes a weather condition of the location where the second object is located, and the step S130 in FIG. 1 of acquiring first information related to the second object may include:

S231: acquiring pre-stored location information of the second object from a cloud server;

S232: acquiring a weather condition of the location as the first information from the Internet based on the location information.

According to the above, for example, the first information related to the second object may be weather information of the location of the second object. The pre-stored location information can be acquired from a cloud server bound to another human-computer interaction device used by the second object. In addition, the human-computer interaction device may also request corresponding first information from another human-computer interaction device used by the second object and then receive the first information input by the second object via another human-computer interaction device (e.g., via voice or keyboard, etc.). Optionally, if the first information is not stored in the cloud server, the human-computer interaction device may also download the first information from the Internet. For example, when the first information is weather information of the location of the second object, weather forecast or weather information of almost any city can be known from the Internet. In this case, the human-computer interaction device may acquire weather data of the city where the second object is located from the Internet according to the pre-stored location information of the second object. The weather data may generally include: weather type, temperature, humidity, wind, air quality, and the like.

Figure 3:
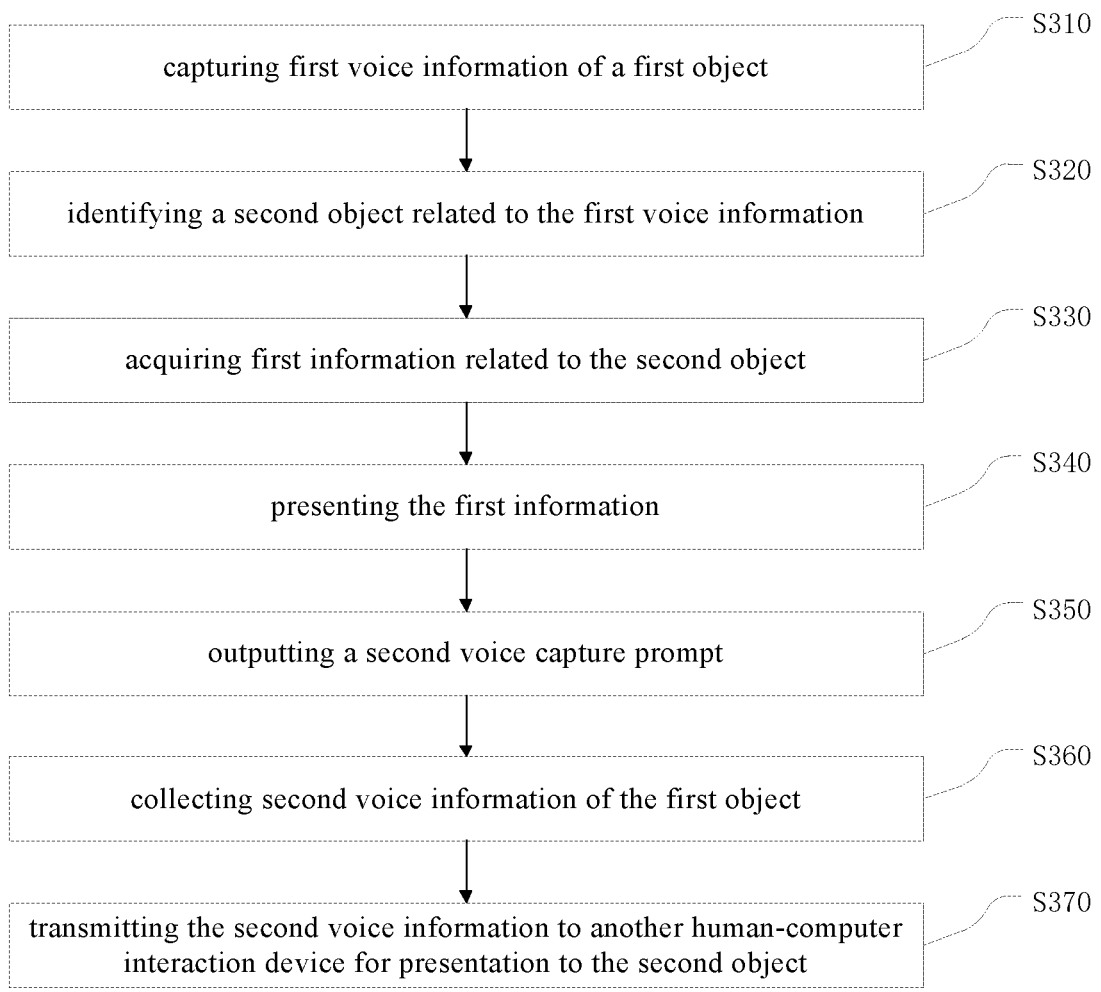
FIG. 3 illustrates a flow chart of a control method for a human-computer interaction device according to some embodiments of the present disclosure.

FIG. 3 illustrates a flow chart of a control method for a human-computer interaction device according to some embodiments of the present disclosure. As shown in FIG. 3, the control method includes steps S310-S370, wherein steps S310-S340 correspond to steps S110-140 shown in FIG. 1 and thus the details thereof are not described herein again, and S350-S370 is described in detail below.

S350: outputting a second voice capture prompt in response to displaying the first information.

In a scenario in which a smart picture frame is used as a human-computer interaction device, after outputting the weather condition of the city where the second object is located, the smart picture frame may further output a second voice capture prompt to prompt the current user (i.e., the first object) to perform voice input, such as a concern or a suggestion, etc. given to the second object. The voice capture prompt can be implemented by displaying the prompt text on the screen of the smart picture frame, or presenting the prompt voice through the speaker of the smart picture frame.

S360: capturing second voice information of the first object.

After receiving the second voice capture prompt, the first object may input a second voice to the human-computer interaction device, that is, a care or a concern or a suggestion for the current status (e.g., the first information) given to the second object. Correspondingly, the human-computer interaction device can use the microphone to capture the second voice input by the first object, and then transmit it to the electronic terminal (e.g., another human-computer interaction device or other smart electronic device that can connected to the network) of the second object of interest to the first object through the network.

S370: transmitting the second voice information to another human-computer interaction device in at least one of a voice and a text format for presentation to the second object.

After capturing the second voice information, the human-computer interaction device sends it to another human-computer interaction device used by the second object, and then the second object receives the second voice information input by the first object through another human-computer interaction device. In this way, through this two-machine communication method, real-time interaction between two users or objects remotely separated is realized, thereby facilitating the seamless transmission of kinship. Regarding the transmission format of the second voice information, the original voice format may be adopted such that the original second voice of the first object is delivered to the second object, thus the second object can hear the concern with the first object tone, thereby enhancing the experience. Of course, the second voice format can also be converted into a text format, so that it can be sent to the electronic terminal (for example, a mobile phone) of the second object in the form of a short message, so that the second object can pay attention to the concern of the first object in time. The electronic terminal bound to the second object may be a mobile smart terminal carried by the second object, such as a mobile phone or a smart bracelet, and the second voice may be directly sent to the target terminal in a form of a voice short message or a voice message in other communication APPs.

Figure 4:
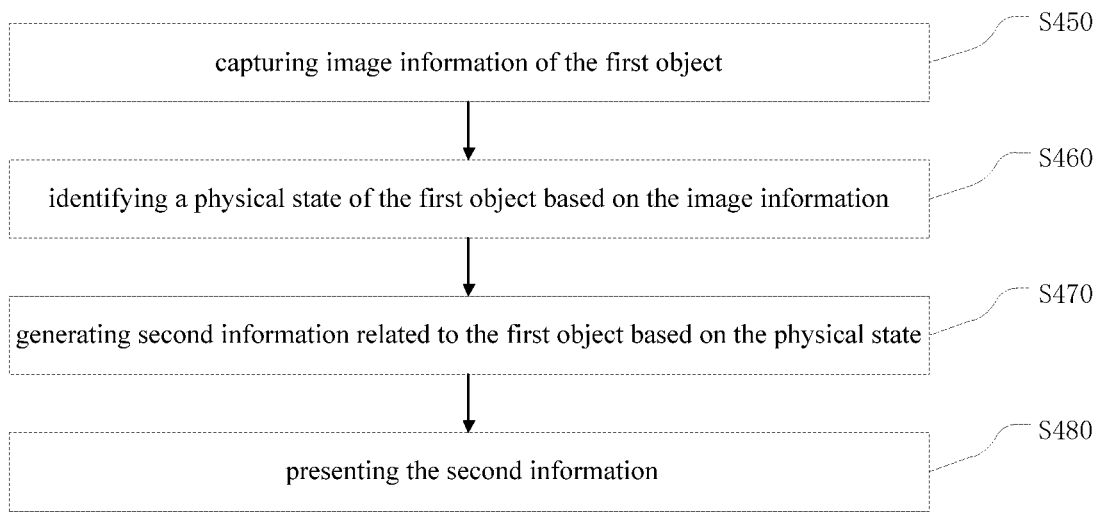
FIG. 4 illustrates a flow chart of a control method for a human-computer interaction device according to some embodiments of the present disclosure.

FIG. 4 illustrates a flow chart of a control method for a human-computer interaction device according to some embodiments of the present disclosure. As shown in FIG. 4, the control method shown in FIG. 1 may further include the following steps:

S450: capturing image information of the first object;

S460: identifying a current physical state of the first object based on the image information of the first object;

S470: generating second information related to the first object based on the current physical state of the first object; and S480: presenting the second information.

In step S450, the human-computer interaction device may also capture image information of the first object through an image capture device (such as a camera). Then, based on the captured image, the physical state of the first object (such as an elderly person) is judged (for example, whether the person is fatigued, whether the person is physically unwell, etc.). Finally, based on the physical state, suggestions are given, such as suggesting appropriate rest or even consulting a doctor. Optionally, steps S110-S140 related to the first voice capturing of FIG. 1 and steps S450-470 related to the image capturing shown in FIG. 4 may be independent of each other. Generally, the capturing of image information of the first object (i.e., the current user) is mainly used for the user to know his or her physical state and output prompt or suggestion information based on the physical state.

In step S460, for example, in some embodiments, the time of continuous standing (e.g., in front of the smart picture frame) may be recorded based on the image or video of the first object acquired in real time, and a time threshold is set. When the standing time exceeds the time threshold, it is determined that the first object is in a fatigue state. Then, in step S470, a suggestion or prompt for sitting down or lying down may be given as the second information related to the first object based on the fatigue state described above.

For example, in an application scenario in which a smart picture frame is used as a human-computer interaction device, a real-time captured image or video of a first object (parent) in front of the smart picture frame may be transmitted to a mobile phone of a second object (i.e., children) to enable him or her to see the first object. In this case, the physical state of the first object may be judged based on the image and video of the first object, for example, the whitish color of face may represent poor blood circulation, anemia, etc., and redness of the eyes may represent insufficient sleep. So the second object can give a corresponding advice as the second information, such as more rest, appropriate exercise or blood enrichment, or even seek medical attention as soon as possible.

Figure 5:
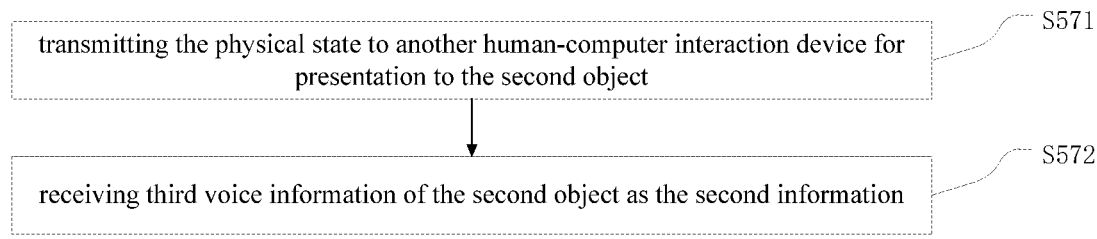
FIG. 5 illustrates a flow chart of a control method for a human-computer interaction device according to some embodiments of the present disclosure.

FIG. 5 illustrates a flow chart of a control method for a human-computer interaction device according to some embodiments of the present disclosure. As shown in FIG. 5, the step S470 shown in FIG. 4 of generating second information related to the first object based on the current physical state of the first object may include:

S571: transmitting the current physical state of the first object to another human-computer interaction device for presentation to the second object; and S572: receiving third voice information of the second object from another human-computer interaction device as the second information.

The embodiment shown in FIG. 5 actually utilizes two interactive devices to transmit the current state of the first object to the second object and correspondingly receive the third voice information from the second object, i.e. concerns and suggestions given to the first object for the current physical state of the first object. Compared with outputting the second information by the human-computer interaction device, in the method shown in FIG. 5, the third voice information of the second object is played or displayed as the second information, and the concerns are given to the first object (such as a parent) with the tone of the second object (such as a child), which can significantly increase the cordial feeling of the current user (i.e., the first object), thereby increasing the user experience effectively.

Figure 6:
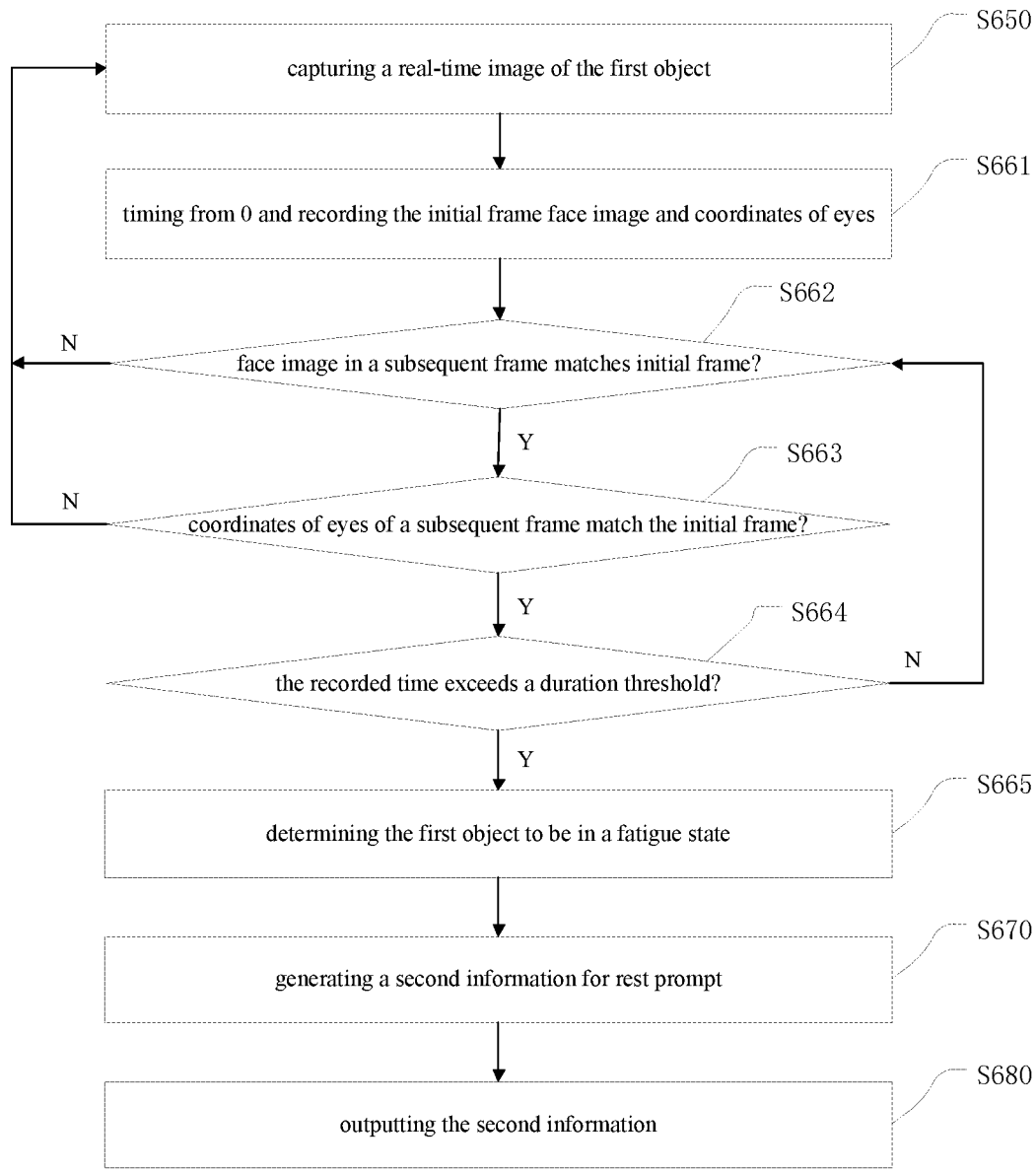
FIG. 6 illustrates a flow chart of a control method for a human-computer interaction device according to some embodiments of the present disclosure.

FIG. 6 illustrates a flow chart of a control method for a human-computer interaction device according to some embodiments of the present disclosure. In the control method shown in FIG. 6, first, by capturing an image of the first object in real-time, it is possible to record in real-time the duration of maintaining the same posture (such as standing or sitting, etc.) in front of an interactive device such as a smart picture frame. When the duration is too long, the interactive device can remind the user that the user is in a state of fatigue and needs to change posture, have a rest or exercise properly. Whether the duration is too long can be defined by a duration threshold. For example, a time threshold may be preset based on the age, health condition, etc. of the first object, such as 10 minutes. If the duration is more than ten minutes, the interactive device may display the prompt information in a text manner through the display or play the audio prompt information through the speaker, to remind the first object.

As shown in FIG. 6, the control method of FIG. 4 may further be embodied as the following steps:

S650, capturing a real-time image of the first object;

S661, continuously timing from 0, and taking the current frame as an initial frame and recording the initial frame face image and coordinates of eyes in the initial frame.

S662, comparing subsequent frames one by one with the initial frame, and determining whether each subsequent frame matches the initial frame face image, if yes, proceed to S663, otherwise return to S650;

S663, determining whether the coordinates of eyes of each subsequent frame matches the initial frame, if yes, proceed to S664, otherwise go to S650.

S664, determining whether the recorded time exceeds a duration threshold, if yes, proceed to S665, otherwise go to S662;

S665, determining the first object to be in a fatigue state;

S670, generating a second information regarding rest prompt in response to the fatigue state of the first object;

S680: outputting the second information.

In the above control method as shown in FIG. 6, step S650 corresponds to S450 shown in FIG. 4; S661-665 corresponds to S460 shown in FIG. 4; S670 corresponds to S470 shown in FIG. 4; S680 corresponds to S480 of FIG. 4.

In some embodiments, with respect to duration recording, it may be determined by frame-by-frame comparison of real-time images whether the first object continues to be in the same posture in front of the interactive device. Specifically, firstly, the face and the position coordinates (x11, y11), (x21, y21) of the left and right eyes in the initial image of the first frame are recorded, and time duration is recorded from 0. Secondly, each image frame starting from the second frame is compared with the initial image face of the first frame one by one, and whether the first object remains in the same posture is determined by the following two determination conditions: first, determining whether the face in each subsequent frame matches the face in the initial image;

second, determining whether the positions of the human eyes in each subsequent frame image is the same as or similar to the initial positions (the error is not greater than a certain threshold). If the above two conditions are satisfied simultaneously, the user keeps watching the smart picture frame in the same posture and continuously records the duration; if the above two conditions are not simultaneously satisfied or the duration exceeds the time threshold, interrupts time recording. After the interrupting, the current frame image is taken as the initial frame, and the determination steps of the above two conditions are repeated, and the duration is re-recorded until the next interruption, and so on.

In step S662, determining whether the coordinates of eyes matches the initial frame can be understand as whether the coordinates are the same or similar. For example, if the error does not exceed a certain error threshold, the frames can be considered to be matched. It is obviously that the positions of the eyes should not be defined to be exactly the same, because the person cannot be completely still, so it is necessary to preset the error threshold to judge whether or not the match is made.

Figure 7:
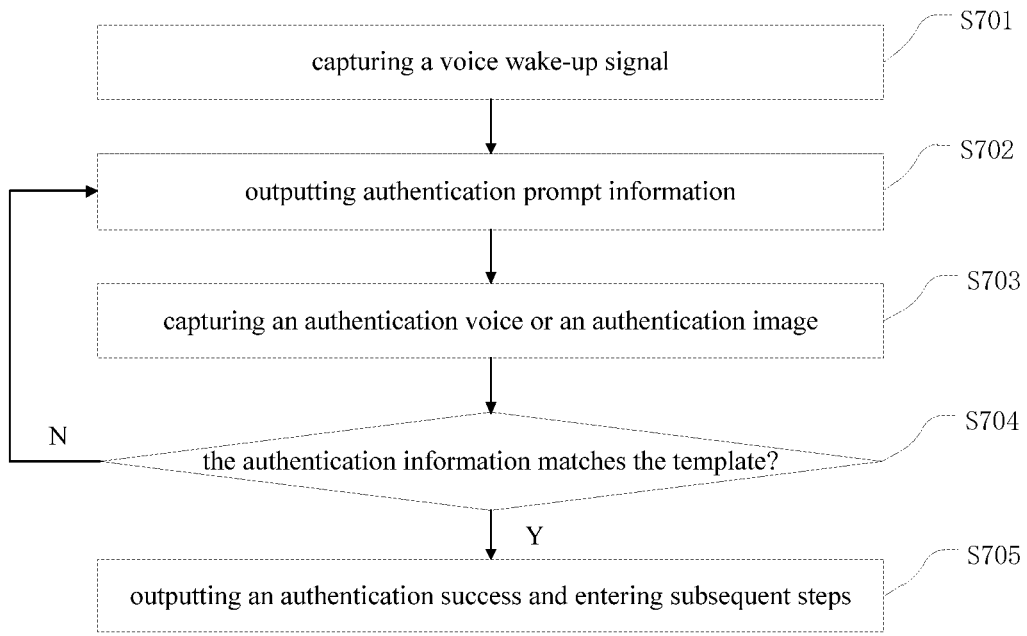
FIG. 7 illustrates a flow chart of a control method for a human-computer interaction device according to some embodiments of the present disclosure.

FIG. 7 illustrates a flow chart of a control method for a human-computer interaction device according to some embodiments of the present disclosure. As shown in FIG. 7, the control method according to some embodiments of the present disclosure further includes wake-up and authentication steps S701-S703 before the steps of S110-140 shown in FIG. 1 (or before the steps of S450-480 of FIG. 4) to cope with the situation of multiple users. That is, the control method shown in FIG. 7 includes steps S701-S703 representing the device wake-up and identity authentication process before the subsequent steps are performed. Steps S701-S705 are explained in detail below.

S701: capturing a voice wake-up signal;

S702: outputting authentication prompt information in response to the voice wake-up signal;

S703: acquiring at least one of an authentication voice and an authentication image;

S704: comparing at least one of the captured authentication voice and authentication image with at least one of a voice template and a facial image template of the first object that are pre-stored to determine whether the authentication information matches the template;

S705: in response to at least one of the captured authentication voice and the authentication image matching at least one of the voice template and the facial image template of the first object that are pre-stored, outputting an authentication success information and proceeding to the subsequent steps, otherwise proceeding to the step S702 to re-capture the wake-up signal.

In the embodiment shown in FIG. 7, the voice wake-up signal captured by the human-computer interaction device (such as a smart picture frame) may be a specific voice preset by the system, such as a wake-up word such as "Hello, Xiao Ming". After receiving the wake-up signal, the human-computer interaction device may output authentication prompt information, prompting the user to perform an authentication process to determine whether the current user is an authenticated user. For the specific authentication process, the authentication information of the authentication user (e.g. the first object), such as the authentication voice or the facial image template, may be pre-stored in the memory of the human-computer interaction device, and then the captured user authentication voice or facial image are compared with the templates. Then, it is judged whether the authentication is passed; in the case of matching, the human-computer interaction device can output the authentication success information and continue the subsequent steps, otherwise it can directly exit, return to the wake-up step, and optionally return to the step of capturing authentication information for re-authentication.

As shown in FIG. 7, the addition of the wake-up and authentication steps enables the exclusive kinship reminder function between specific users (such as the relatives of the device owner) in the case where there are multiple users in the human-computer interaction device, and only the authenticated users are allowed to use this function and other users are blocked, thus increasing the efficiency while adding important user rights.

Figure 8:
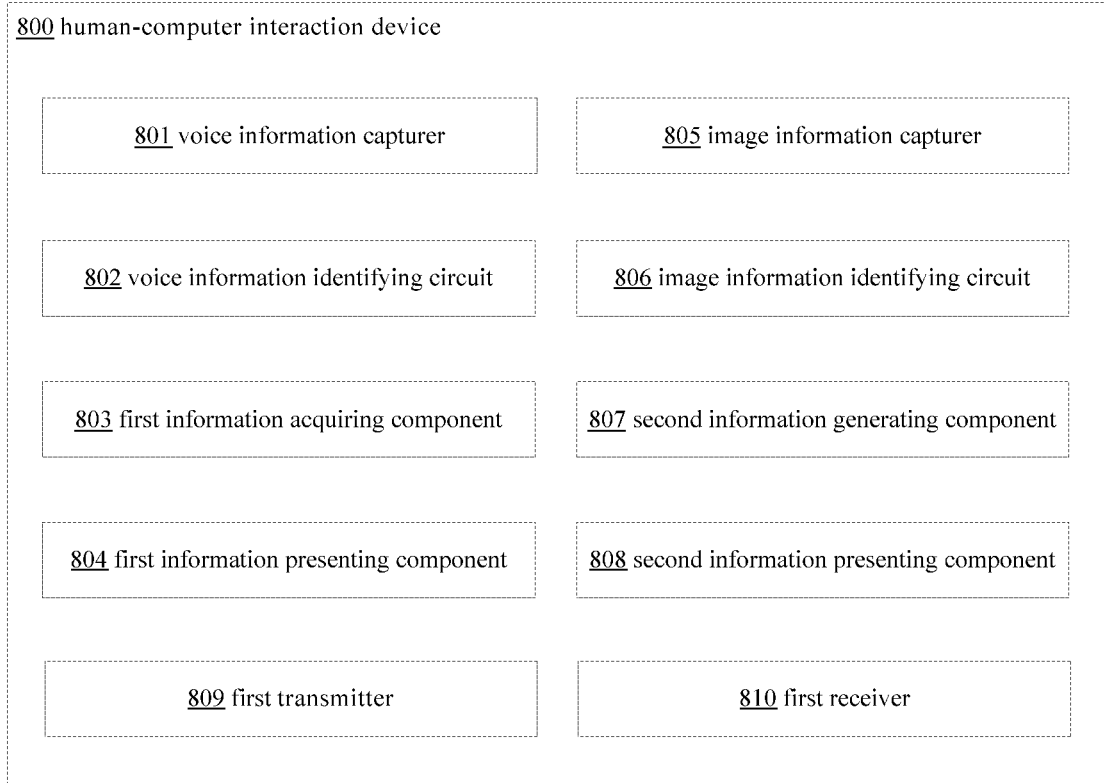
FIG. 8 is a block diagram schematically showing a structure of a human-computer interaction device according to some embodiments of the present disclosure.

FIG. 8 illustrates a human-computer interaction device according to some embodiments of the present disclosure. As shown in FIG. 8, the human-computer interaction device 800 includes:

a voice information capturer 801 configured to capture first voice information of the first object;

a voice information identifying circuit 802 configured to identify a second object related to the first voice information;

a first information acquiring component 803 configured to acquire first information related to the second object;

a first information presenting component 804 configured to present the first information.

In some embodiments, as shown in FIG. 8, the human-computer interaction device 800 may further include:

an image information capturer 805 configured to capture image information of the first object;

an image information identifying circuit 806 configured to identify a current physical state of the first object based on the image information of the first object;

a second information generating component 807 configured to generate second information related to the first object based on the current physical state of the first object;

a second information presenting component 808 configured to present the second information.

In some embodiments, the human-computer interaction device 800 according to some embodiments of the present disclosure may further include: a first transmitter 809 configured to transmit the current physical state of the first object to another human-computer interaction device for presentation to the second object; and a first receiver 810 configured to receive third voice information of the second object from the another human-computer interaction device as the second information.

In some embodiments, the voice information capturer 801 may include a microphone for receiving audio signals; the image information capturer 805 may include a camera for acquiring or capturing images or video; the first and second information presenting components 804 and 807 may include a screen for presenting information to the user in a visual manner through images, video clips, texts, etc., or a speaker for outputting information to the user through an audible manner such as sound. The voice information identifying circuit 802 and the image information identifying circuit 806 may be circuit systems or devices configured to have functions of reading, identifying, and processing voice signals and image signals, respectively. Regarding other components or modules in the human-computer interaction device 800 shown in FIG. 8, for example, the first information acquiring component 803 and the second information generating component 807, may include separate hardware, software, firmware that implements the corresponding functions, or a combination thereof. For example, it may be a processor, a single chip microcomputer, a chip that having a data transceiving and processing capability, a discrete logic circuit having a logic gate circuit for implementing a logic function on a data signal, an application specific integrated circuit having a suitable combination of logic gate circuits, a programmable gate array, a field programmable gate array, or the like, or a combination of any two or more of the above hardware.

Specifically, the specific hardware configuration of the human-computer interaction device according to some embodiments of the present disclosure may include: a MIC array board, a SOC motherboard, a camera, a power board, a TCON board, a WIFI antenna, and a speaker. The MIC array board is used as a sound capturing component for receiving voice information; the SOC motherboard is used as the aforementioned processor for performing data processing, executing the above computer program, and performing data communication with the cloud server through the WIFI antenna; the camera is used as an image capturing component; the speaker is used for playing voice; the TCON board is used for driving the screen of the smart picture frame; the power board is used for powering various components. Of course, the human-computer interaction device according to the present disclosure is not limited to the above structure.

Figure 9:
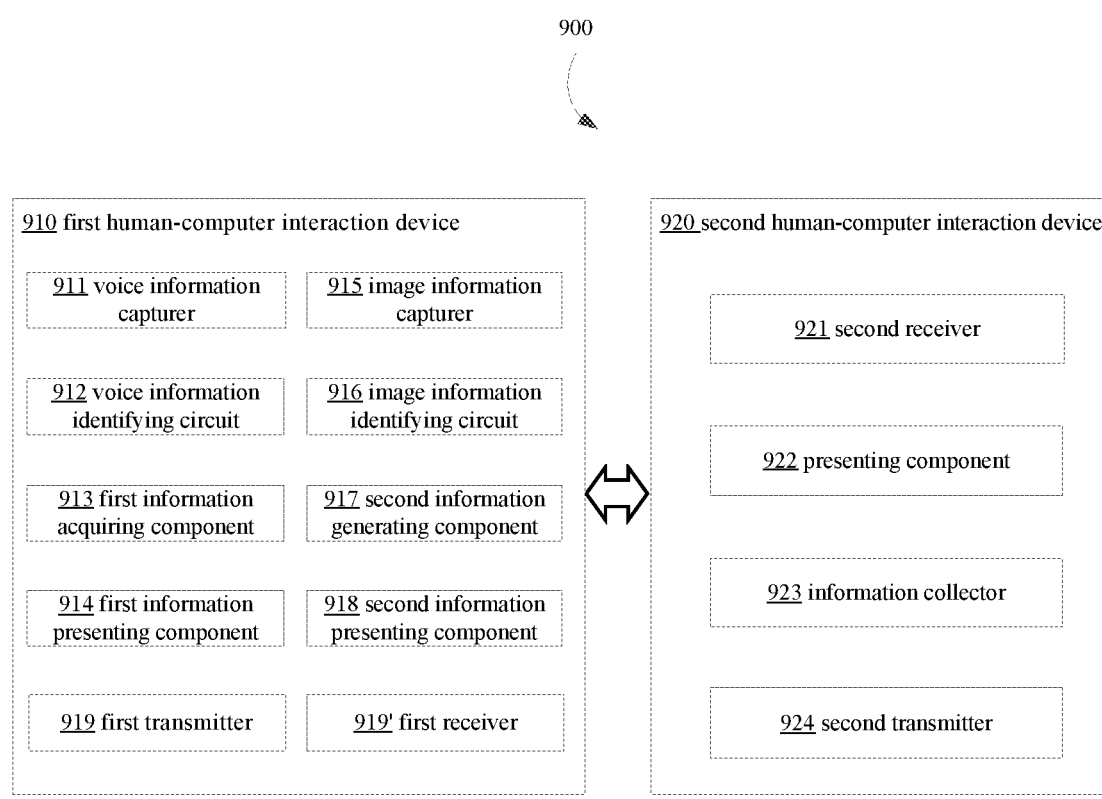
FIG. 9 schematically illustrates a block diagram showing a human-computer interaction system according to some embodiments of the present disclosure.

FIG. 9 schematically illustrates a human-computer interaction system according to some embodiments of the present disclosure. As shown in FIG. 10, the human-computer interaction system 900 according to some embodiments of the present disclosure includes a first human-computer interaction device 910 and a second human-computer interaction device 920 that is in remote communication with the first human-computer interaction device 910.

As shown in FIG. 9, the first human-computer interaction device 910 may include a voice information capturer 911, a voice information identifying circuit 912, a first information acquiring component 913, a first information presenting component 914, an image information capturer 915, an image information identifying circuit 916, a second information generating component 917, a second information presenting component 918, a first transmitter 919, and a first receiver 919'. These components 911-919' correspond to components 801-810 in the human-computer interaction device 800 shown in FIG. 8, respectively. As shown in FIG. 9, the second human-computer interaction device 920 includes:

a second receiver 921 configured to receive a current physical state of the first object from the first human-computer interaction device;

a presenting component 922 configured to present the current physical state of the first object;

an information capturer 923 configured to capture third voice information of the second object in response to the presented current state;

a second transmitter 924 configured to transmit the third voice information to the first human-computer interaction device.

In some embodiments, the information capturer 923 may be an audio signal receiving device such as a microphone for acquiring voice signals; the presenting component 922 include a screen for presenting information to the user in a visual manner through images, video clips, texts, etc., or a speaker for outputting information to the user through an audible manner such as sound; respective transmitters and receivers, such as the first and second transmitters 919 and 924, and the first and second receivers 919' and 921 may respectively include a signal transmitting device and a signal receiving device having signal transmitting and signal receiving capabilities, respectively.

The human-computer interaction system 900 according to some embodiments of the present disclosure shown in FIG. 9 may be used to implement a control method for a human-computer interaction device according to some embodiments of the present disclosure as described above. For a specific implementation, please refer to the description above on the control method.

In some embodiments according to the present disclosure, there is provided a computer readable storage medium having stored thereon computer readable instructions that, when executed, control a human-computer interaction device according to some embodiments of the present disclosure to implement a control method for a human-computer interaction device according to some embodiments of the present disclosure.

In the description of the present specification, the descriptions of the terms "one embodiment", "some embodiments", "example", "specific example", or "some examples" and the like mean the specific features, structures, materials or characteristics described in connection with the embodiment or the example are comprised in at least one embodiment or example of the present disclosure. In the present specification, the schematic reference of the above terms is not necessarily directed to the same embodiment or example. Furthermore, the particular features, structures, materials, or characteristics described may be combined in a suitable manner in any one or more embodiments or examples. In addition, those skilled in the art can combine the different embodiments or examples described in this specification and features of different embodiments or examples without conflicting with each other.

Any process or method description in the flowcharts or otherwise described herein may be understood to represent a module, segment or portion of code comprising one or more executable instructions for implementing the steps of a custom logic function or process. And the scope of the preferred embodiments of the present disclosure comprises additional implementations in which the functions may not be performed in an order shown or discussed, comprising in a substantially simultaneous manner or in the reverse order, depending on the function involved, which will be understood by those skilled in the art to which the embodiments of the present disclosure pertain.

The logic and/or steps represented in the flowchart or otherwise described herein, for example, an ordered list of executable instructions which may be considered to implement logical functions, may be embodied in any computer readable medium to be used by or in conjunction with an instruction execution system, apparatus, or device, e.g., a computer-based system, a system comprising a processor, or other system that can fetch instructions and execute instructions from an instruction execution system, apparatus, or device. In terms of this specification, a "computer-readable medium" can be any apparatus that can contain, store, communicate, propagate, or transport a program for use by or in conjunction with an instruction execution system, apparatus, or device. More specific examples of the computer readable medium may comprise, for example, an electrical connection (electronic device) having one or more wires, a portable computer disk (magnetic device), a random access memory, a read only memory, an erasable programmable read only memory or flash memory, an optic fiber device, and a compact disc read only memory. In addition, the computer readable medium may even be a paper or other suitable medium on which the program can be printed, as the program may be electronically obtained by optically scanning paper or other medium, for example, followed by editing, compiling or processing in other suitable manner, if appropriate, and then the program are stored in computer memory.

The terms "component," "module," "device," and the like, when used in this specification, may generally mean a computer-related entity, or hardware, a combination of hardware and software, software, or executed software, Unless otherwise specified in the context. For example, such a component can be, but are not limited to, process running on a processor, a processor, an object, an executable file, a thread of execution, a program, and/or a computer. For example, both an application running on a controller and the controller can be a component. One or more components can reside within a process and/or a thread of execution, and the components can be located on a single computer (device) and/or distributed between two or more computers (devices).

It should be understood that portions of the present disclosure can be implemented in hardware, software, firmware, or a combination thereof. In the above-described embodiments, multiple steps or methods may be implemented in software or firmware stored in a memory and executed by a suitable instruction execution system. For example, if implemented in hardware, it can be implemented by any one or combination of the following techniques well known in the art: discrete logic circuit having logic gate circuit for implementing logic functions on data signals, application specific integrated circuit having suitable combination of logic gate circuits, programmable gate array, field programmable gate array, and the like.

One of ordinary skill in the art will appreciate that all or a portion of the steps of the above-described embodiments may be performed by a hardware associated with the program instructions, and the program may be stored in a computer readable storage medium, which, when executed, performs one or a combination of the steps of the method embodiments.

In addition, functional units in various embodiments of the present disclosure may be integrated into one processing module, or may exist physically separately, or two or more units may be integrated into one module. The above integrated modules can be implemented in the form of hardware or in the form of software functional modules. The integrated modules, if implemented in the form of software functional modules and sold or used as stand-alone products, may also be stored in a computer readable storage medium.

It should be noted that, in the claims, the use of the verb "comprising/comprise" and its variants does not exclude the presence of elements or steps not recited in the claims, and the wording "a" or "an" does not exclude a plurality.

Embodiments of the present disclosure intended to include all alternatives, modifications, and variations within the scope of the appended claims. Therefore, any omissions, modifications, equivalents, improvements, etc., which are made within the spirit and scope of the present disclosure are intended to be included within the scope of the present disclosure.

The invention claimed is:

1. A control method for a human-computer interaction device, comprising:
    capturing first voice information of a first object;
    identifying a second object related to the first voice information;
    acquiring first information related to the second object;
    presenting the first information;
    capturing image information of both face and posture of the first object;
    generating second information related to the first object based on the image information; and
    presenting the second information
    wherein the capturing image information of both face and posture of the first object comprises capturing a real-time image of the first object, and
    wherein the generating second information related to the first object based on the image information comprises:
        recording the duration in real-time from zero while collecting the real-time image, and taking the current frame image as an initial frame image and recording a face image in the initial frame image and coordinates of eyes in the initial frame image;
        comparing each subsequent frame with the initial frame and determining whether the face image in each subsequent frame and the coordinates of the eyes match the initial frame;
        in response to the face image in each subsequent frame and the coordinates of the eyes both matching the initial frame, comparing the recorded duration with a duration threshold to determine whether the recorded duration exceeds the duration threshold; and
        in response to the recorded duration exceeding the duration threshold, generating the second information.

2. The control method according to claim 1, wherein the human-computer interaction device comprises a smart picture frame.

3. The control method according to claim 1, wherein the presenting the first information comprises: presenting the first information in at least one of an audio manner or a video manner.

4. The control method according to claim 1, wherein the acquiring first information related to the second object comprises: acquiring, from a cloud server or locally, pre-stored first information related to the second object.

5. The control method according to claim 1, wherein the first information related to the second object comprises a weather condition of a location where the second object is located, and
    wherein the acquiring first information related to the second object comprises:
    acquiring pre-stored location information of the second object from a cloud server; and
    acquiring a weather condition of the location from the Internet based on the location information.

6. The control method according to claim 1, further comprising:
    after the presenting the first information, outputting a voice capturing prompt;
    capturing second voice information of the first object; and
    transmitting the second voice information in at least one of a voice format or a text format to a further human-computer interaction device for presentation to the second object.

7. The control method according to claim 1, wherein the generating second information related to the first object based on the image information comprises:
    transmitting the image information to a further human-computer interaction device for presentation to the second object; and
    receiving third voice information of the second object from the further human-computer interaction device as the second information.

8. The control method according to claim 1, wherein before the acquiring first voice information of the first object, the control method further comprises:
  collecting a voice wake-up signal;
  collecting at least one of an authentication voice or an authentication image as an authentication information in response to the voice wake-up signal;
  comparing at least one of the collected authentication voice or the authentication image with at least one of a voice template or an image template of the first object that are pre-stored to determine whether the authentication information matches the at least one of the voice template or the image template; and
  in response to the authentication information matches the at least of the voice template or the image template, outputting an authentication success information.

9. A human-computer interaction device comprising:
  a voice information capturer configured to capture first voice information of a first object;
  a voice information identifying circuit configured to identify a second object related to the first voice information;
  a first information acquiring circuit configured to acquire first information related to the second object;
  a first information display and/or a first information speaker configured to present the first information;
  an image information capturer configured to capture image information of a real-time image of both face and posture of the first object;
  a second information generating circuit configured to: record the duration in real-time from zero while collecting the real-time image, and take the current frame image as an initial frame image and record a face image in the initial frame image and coordinates of eyes in the initial frame image; compare each subsequent frame with the initial frame and determine whether the face image in each subsequent frame and the coordinates of the eyes match the initial frame; in response to the face image in each subsequent frame and the coordinates of the eyes both matching the initial frame, compare the recorded duration with a duration threshold to determine whether the recorded duration exceeds the duration threshold; and in response to the recorded duration exceeding the duration threshold, generate second information related to the first object; and
  a second information display and/or a second information speaker configured to present the second information.

10. A non-transitory computer readable storage medium having stored thereon computer readable instructions that, when executed, control the human-computer interaction device according to claim 9 to implement a control method for a human-computer interaction device, comprising:
  capturing first voice information of a first object;
  identifying a second object related to the first voice information;
  acquiring first information related to the second object;
  presenting the first information;
  capturing image information of both face and posture of the first object;
  generating second information related to the first object based on the image information;
  presenting the second information
  wherein the capturing image information of both face and posture of the first object comprises capturing a real-time image of the first object, and
  wherein the generating second information related to the first object based on the image information comprises:
    recording the duration in real-time from zero while collecting the real-time image, and taking the current frame image as an initial frame image and recording a face image in the initial frame image and coordinates of eyes in the initial frame image;
    comparing each subsequent frame with the initial frame and determining whether the face image in each subsequent frame and the coordinates of the eyes match the initial frame;
    in response to the face image in each subsequent frame and the coordinates of the eyes both matching the initial frame, comparing the recorded duration with a duration threshold to determine whether the recorded duration exceeds the duration threshold; and
    in response to the recorded duration exceeding the duration threshold, generating the second information.

11. The human-computer interaction device according to claim 9, further comprising:
  a first transmitter configured to transmit the second information related to the first object to a further human-computer interaction device for presentation to the second object; and
  a first receiver configured to receive third voice information of the second object from the further human-computer interaction device as the second information.

12. A human-computer interaction system comprising a first human-computer interaction device and a second human-computer interaction device that is in remote communication with the first human-computer interaction device,
  wherein the first human-computer interaction device is the human-computer interaction device according to claim 11, the second human-computer interaction device is the further human-computer interaction device according to claim 11, and the second human-computer interaction device comprises:
  a second receiver configured to receive second information related to the first object from the first human-computer interaction device;
  a display and/or a speaker configured to present the second information related to the first object;
  an information capturer configured to capture third voice information of the second object; and
  a second transmitter configured to transmit the third voice information to the first human-computer interaction device.

* * * * *